United States Patent
Mizoguchi

Patent Number: 5,805,215
Date of Patent: Sep. 8, 1998

[54] INFORMATION PROCESSING METHOD AND APPARATUS FOR STORING ADDITIONAL DATA ABOUT AN IMAGE

[75] Inventor: Yoshiyuki Mizoguchi, Kawasaki, Japan

[73] Assignee: Canon Kabushiki Kaisha, Tokyo, Japan

[21] Appl. No.: 423,097

[22] Filed: Apr. 18, 1995

[30] Foreign Application Priority Data

Apr. 21, 1994 [JP] Japan .................................. 6-082979
Oct. 7, 1994 [JP] Japan .................................. 6-270343

[51] Int. Cl.$^6$ ................................................. H04N 5/225
[52] U.S. Cl. .......................................................... 348/232
[58] Field of Search .......................... 348/232, 461–468, 348/473, 143–161; 358/909.1; 396/310–321; H04N 5/225

[56] References Cited

U.S. PATENT DOCUMENTS 5,335,072  8/1994  Tanaka et al. .......................... 348/232

FOREIGN PATENT DOCUMENTS 495612    1/1991   European Pat. Off. ......... G06F 15/02
4-70735   3/1992   Japan ............................. G03B 17/24
WO93-14458 7/1993  WIPO .............................. G06F 15/02

OTHER PUBLICATIONS

Patent Abstracts of Japan, vol. 017 No. 581 (P–1631), 21 Oct., 1993, & JP–A–05 165935 (Konica Corp) Jul. 22, 1993.
Patent Abstracts of Japan, vol. 016 No. 276 (P–1374), Jun. 19, 1992 & JP–A–04 071070 (Minolta Camera Co Ltd), Mar. 5, 1992.
Patent Abstracts of Japan, vol. 016. No. 276 (P–1374), Jun. 19, 1992 & JP–A–04 071069 (Minolta Camera Co. Ltd.), Mar. 5, 1992.
Patent Abstracts of Japan, vol. 011 No. 253 (P–606), Aug. 18, 1987 & JP–A–62 059894 (Casio Comput Co Ltd), Mar. 16, 1987.
Patent Abstracts of Japan, vol. 014 No. 547 (P–1138), Dec. 5, 1990, & JP–A–02 232771 (Canon Inc) Sep. 14, 1990.
Patent Abstracts of Japan, vol. 95 No. 6, Jul. 1995 & JP–A–07 072546 (Konica Corp) Mar. 17, 1995.

*Primary Examiner*—John K. Peng
*Assistant Examiner*—Nathan J. Flynn
*Attorney, Agent, or Firm*—Fitzpatrick, Cella, Harper & Scinto

[57] ABSTRACT

Disclosed is an information processing method of generating image data and additional data paired with the image data and capable of searching image data at high speed. Photographic time at which image data is photographed is compared with a predetermined time range (S1, S2, S3, S4). Event information corresponding to the predetermined time range in which its photographic time is included is added to the image data (S5) and stored. An image data search operation is performed on the basis of the stored event information.

16 Claims, 12 Drawing Sheets

FIG. 4A

DATA [m] = Table {TYPE, CONTENTS}
SCHEDULE [n] = Table {m, DATA [m]}

FIG. 4B

| SCHEDULE [1] | = | 7 | 0 | GOLF | 1 | 1993/01/22/08/00~1993/01/22/17/00 | 2 | YOSHIDA | 2 | INOUE | 2 | GOTO |
| | | | 3 | ABC GOLF CLUB | 5 | APPOINTMENT: 6 O'CLOCK, SHIBUYA | | | | | | |
| SCHEDULE [2] | = | 10 | 0 | PARTY | 1 | 1993/01/22/17/00~1993/01/22/19/00 | 2 | YOSHIDA | 2 | INOUE | 2 | GOTO |
| | | | 2 | ARAI | 2 | YAMAMOTO | 2 | HAMADA | 2 | AOYAMA | 3 | ABC GOLF CLUB |

FIG. 4C

SCHEDULE [1]
SCHEDULE [1] .m = 7
SCHEDULE [1] .DATA [1] .TYPE = 0,    SCHEDULE [1] .DATA [1] .CONTENTS = GOLF
SCHEDULE [1] .DATA [2] .TYPE = 1,    SCHEDULE [1] .DATA [2] .CONTENTS = 1993/01/22/08/00~1993/01/22/17/00
SCHEDULE [1] .DATA [3] .TYPE = 2,    SCHEDULE [1] .DATA [3] .CONTENTS = YOSHIDA
SCHEDULE [1] .DATA [4] .TYPE = 2,    SCHEDULE [1] .DATA [4] .CONTENTS = INOUE
SCHEDULE [1] .DATA [5] .TYPE = 2,    SCHEDULE [1] .DATA [5] .CONTENTS = GOTO
SCHEDULE [1] .DATA [6] .TYPE = 3,    SCHEDULE [1] .DATA [6] .CONTENTS = ABC GOLF CLUB
SCHEDULE [1] .DATA [7] .TYPE = 5,    SCHEDULE [1] .DATA [7] .CONTENTS = APPOINTMENT: 6 O'CLOCK, SHIBUYA

FIG. 5A

```
┌─────────────────────────────────────────┐
│ JANUARY 20, 1993      (CHANGE) (IMAGE   │
│                                SEARCH)  │
├─────────────────────────────────────────┤
│ "GOLF"                                  │
│                                         │
│    TIME: JANUARY 22, 1993  8:00~17:00   │
│    PERSON: YOSHIDA, INOUE, AND GOTO     │
│    PLACE: ABC GOLF CLUB                 │
│    APPOINTMENT: 6 O'CLOCK, SHIBUYA      │
│                                         │
│                                         │
└─────────────────────────────────────────┘
                                          7

FIG. 5B

┌─────────────────────────────────────────┐
│ JANUARY 20, 1993      (CHANGE) (IMAGE   │
│                                SEARCH)  │
├─────────────────────────────────────────┤
│ "PARTY"                                 │
│                                         │
│    TIME: JANUARY 22, 1993  17:00~19:00  │
│    PERSON: YOSHIDA, INOUE, GOTO, ARAI,  │
│            YAMAMOTO, HAMADA, AND AOYAMA │
│    PLACE: ABC GOLF CLUB                 │
│                                         │
│                                         │
└─────────────────────────────────────────┘
                                          7
```

FIG. 8A

DATA [m] = Table {TYPE, CONTENTS}
SCHEDULE [n] = Table {m, DATA [m], IMAGE DATA}

FIG. 8B

| | 0 | GOLF | 1 | 1993/01/22/13:28 | 2 | YOSHIDA | 3 | ABC GOLF CLLUB |
|---|---|---|---|---|---|---|---|---|

| IMAGE [1] | = | 4 | IMAGE DATA |
|---|---|---|---|

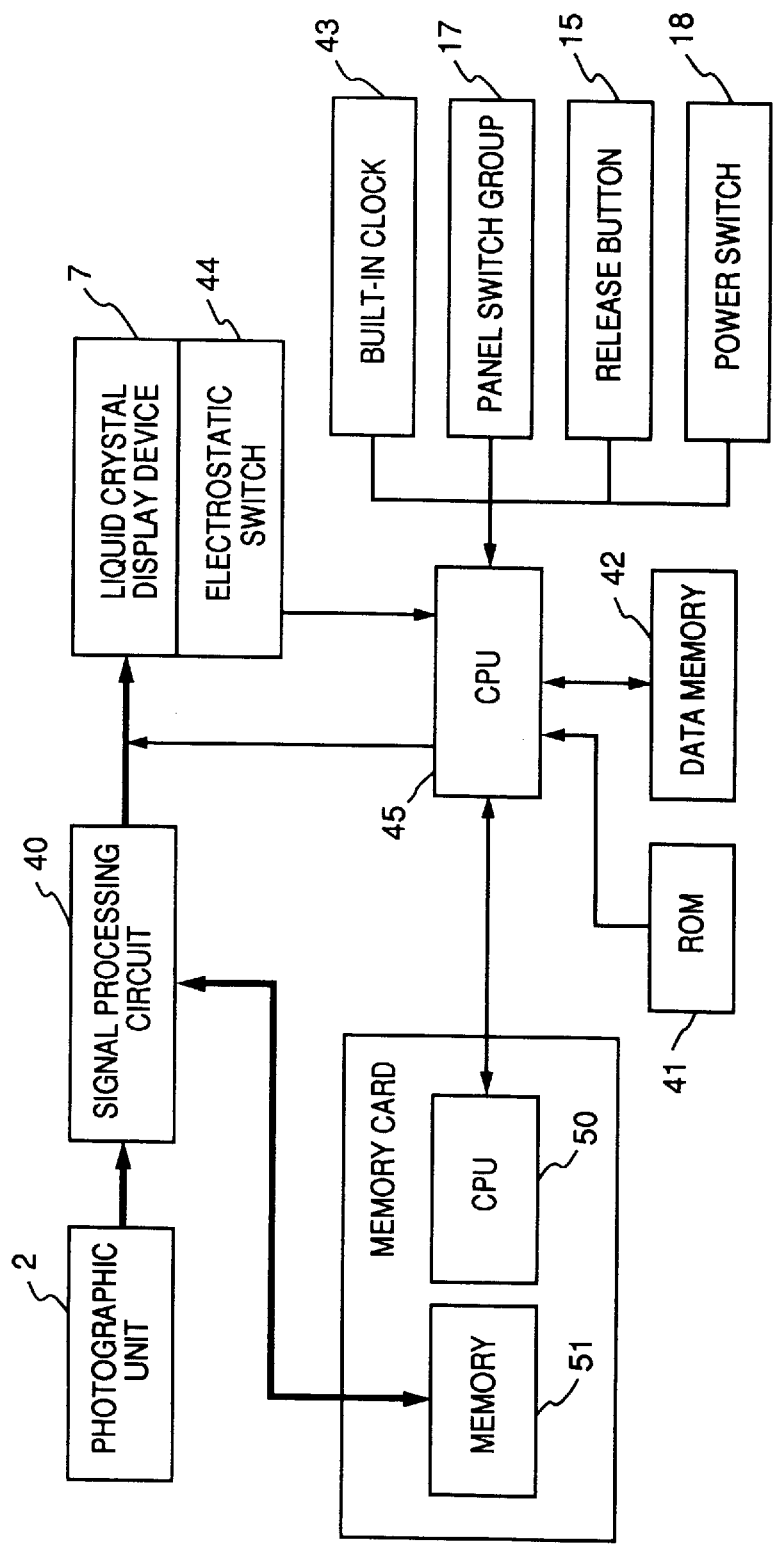

INFORMATION PROCESSING METHOD AND APPARATUS FOR STORING ADDITIONAL DATA ABOUT AN IMAGE

BACKGROUND OF THE INVENTION

The present invention relates to an information processing method of recording and reproducing electronic information and an apparatus therefor.

In conventional photography using a silver salt film, along with developments of camera techniques including automatic focus control (AF) and automatic exposure control (AE), a photograph intended by a photographer has been able to be taken with an easy operation. To search a desired photograph from the photographs taken by the photographer, it is important that the photographs taken by the photographer are properly filed so as to determine easy access to the desired photograph. This filing entirely depends on the efforts of the photographer.

More specifically, even if there are a large number of excellent photographs which reflect the will of the photographer, improper filing may hoard these photographs. No drastic countermeasures for filing photographs have been made in the conventional photographic system using silver salt films, except for a simple countermeasure such as date imprinting. For this reason, the photographer must file his photographs in an album or the like and record the contents of the photographs, resulting in cumbersome operations.

No system improvement has been made to solve the above problem even in an electronic still camera for recording a photograph as an electrical signal on a floppy disk. Information added to image information includes the date, the serial number, and the like. For this reason, the photographic contents must be described in the recorded floppy disk and managed. These data added to the image information are superposed on analog signals serving as image data. To rewrite these data or add new data, the image data itself must also be rewritten to require a large circuit size. In addition, it is impossible to access these data in a search mode. It is, therefore, difficult to perform a high-speed search operation.

In recent years, an electronic still camera for recording a photograph as a digital signal in a memory card is proposed and put into practical use. In this still camera, data for searching a photographed image can be added easier than in the conventional system. An embodiment disclosed in Japanese Patent Laid-Open No. 4-70735 proposes a method of managing and searching image data.

In this method, any one of a photographic date, a photographic place, weather, a name of person, a portrait, an event, and audio data is recorded as image search data together with image data. The image search data can be input together with the image data automatically or by the photographer upon completion of photography. Subsequently, a data type (search key) is designated. When this data is input, an image having data whose contents are identical to those of the input data is searched. For example, if a person is designated and "Yoshida" is input, an image having portrait data representing a person "Yoshida" is searched and output. If time is designated, and a specific moment is input, an image having the specific moment as the data is searched and output.

In consideration of personal use, the most effective search key of the above search keys in the search mode is the event key representing that a photograph is taken in a "field day", a "golf course", or the like. No general method of inputting event data is described in the above prior art. As a special case, there is described a method of transmitting the above data in only a limited case by means of an electric wave and causing a camera to receive and automatically record the electric wave as image data. In this case, the application range of the camera is undesirably limited.

SUMMARY OF THE INVENTION

The present invention has been made to solve the conventional problems described above, and has as its object to provide an information equipment, capable of filing photographed images during photography, recording management data, and efficiently searching a photographed image.

According to the present invention, the foregoing object is attained by providing an information processing method comprising:

an input step of inputting first data; and a step of storing predetermined third data and the first data input in the input step so as to associate the predetermined third data with the first data when second data associated with the first data input in the input step is identical to the predetermined third data, wherein the first data is searched on the basis of the stored third data.

It is another object of the present invention, the foregoing object is attained by providing an information processing method comprising:

an input step of inputting first data; and a step of storing predetermined third data and the first data input in the input step so as to associate the predetermined third data with the first data when second data associated with the first data input in the input step is included in a category of the predetermined third data, wherein the first data is searched on the basis of the stored third data.

It is another object of the present invention, the foregoing object is attained by providing an information processing method comprising:

an input step of inputting first data; and a step of storing predetermined fourth data associated with predetermined third data and the first data input in the input step so as to associate the predetermined fourth data with the first data when second data associated with the first data input in the input step is identical to the predetermined third data, wherein the first data is searched on the basis of the stored fourth data.

It is another object of the present invention, the foregoing object is attained by providing an information processing method comprising:

an input step of inputting first data; and a step of storing predetermined fourth data associated with predetermined third data and the first data input in the input step so as to associate the predetermined fourth data with the first data when second data associated with the first data input in the input step is included in a category of the predetermined third data, wherein the first data is searched on the basis of the stored fourth data.

According to the present invention, the foregoing object is attained by providing an information processing apparatus comprising:

input means for inputting first data; and means for storing predetermined third data and the first data input by said input means so as to associate the predetermined third data with the first data when second data associated with the first data input by said input means is identical to the predetermined third data, wherein the first data is searched on the basis of the stored third data.

It is another object of the present invention, the foregoing object is attained by providing an information processing apparatus comprising:

input means for inputting first data; and means for storing predetermined third data and the first data input by said input means so as to associate the predetermined third data with the first data when second data associated with the first data input by said input means is included in a category of the predetermined third data, wherein the first data is searched on the basis of the stored third data.

It is another object of the present invention, the foregoing object is attained by providing an information processing apparatus comprising:

input means for inputting first data; and means for storing predetermined fourth data associated with predetermined third data and the first data input by said input means so as to associate the predetermined fourth data with the first data when second data associated with the first data input by said input means is identical to the predetermined third data, wherein the first data is searched on the basis of the stored fourth data.

It is another object of the present invention, the foregoing object is attained by providing an information processing apparatus comprising:

input means for inputting first data; and means for storing predetermined fourth data associated with predetermined third data and the first data input by said input means so as to associate the predetermined fourth data with the first data when second data associated with the first data input by said input means is included in a category of the predetermined third data, wherein the first data is searched on the basis of the stored fourth data.

According to the present invention, the foregoing object is attained by providing an information equipment including input means for inputting information, storage means for storing the input information, and management means for selecting and processing the information to add associated information, the information equipment processing a second type of information having a first type of information as associated information and a third type of information having the first type of information as associated information, wherein said management means comprises comparison means for comparing the first type of information A associated with the third type of information with the first type of information B associated with the second type of information, and when a comparison result from said comparison means represents that the information A is identical to the information B or the information A is included in the information B, the second type of information is added to the associated information of the third type of information.

Other features and advantages of the present invention will be apparent from the following description taken in conjunction with the accompanying drawings, in which like reference characters designate the same or similar parts throughput the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

FIG. 4A is a view for explaining a schedule data structure of the embodiment shown in FIG. 1;

FIG. 4B is a view for explaining a schedule data structure of the embodiment shown in FIG. 1;

FIG. 4C is a view for explaining a schedule data structure of the embodiment shown in FIG. 1;

FIG. 5A is a view showing a display example of the liquid crystal display device of the embodiment shown in FIG. 1;

FIG. 5B is a view showing a display example of the liquid crystal display device of the embodiment shown in FIG. 1;

FIG. 8A is a view for explaining an image data structure of the embodiment shown in FIG. 1;

FIG. 8B is a view for explaining an image data structure of the embodiment shown in FIG. 1;

FIG. 10 is a block diagram showing a circuit for controlling the apparatus in FIG. 1;

DESCRIPTION OF THE PREFERRED EMBODIMENT

Preferred embodiments of the present invention will be described in detail in accordance with the accompanying drawings.

Figure 1:
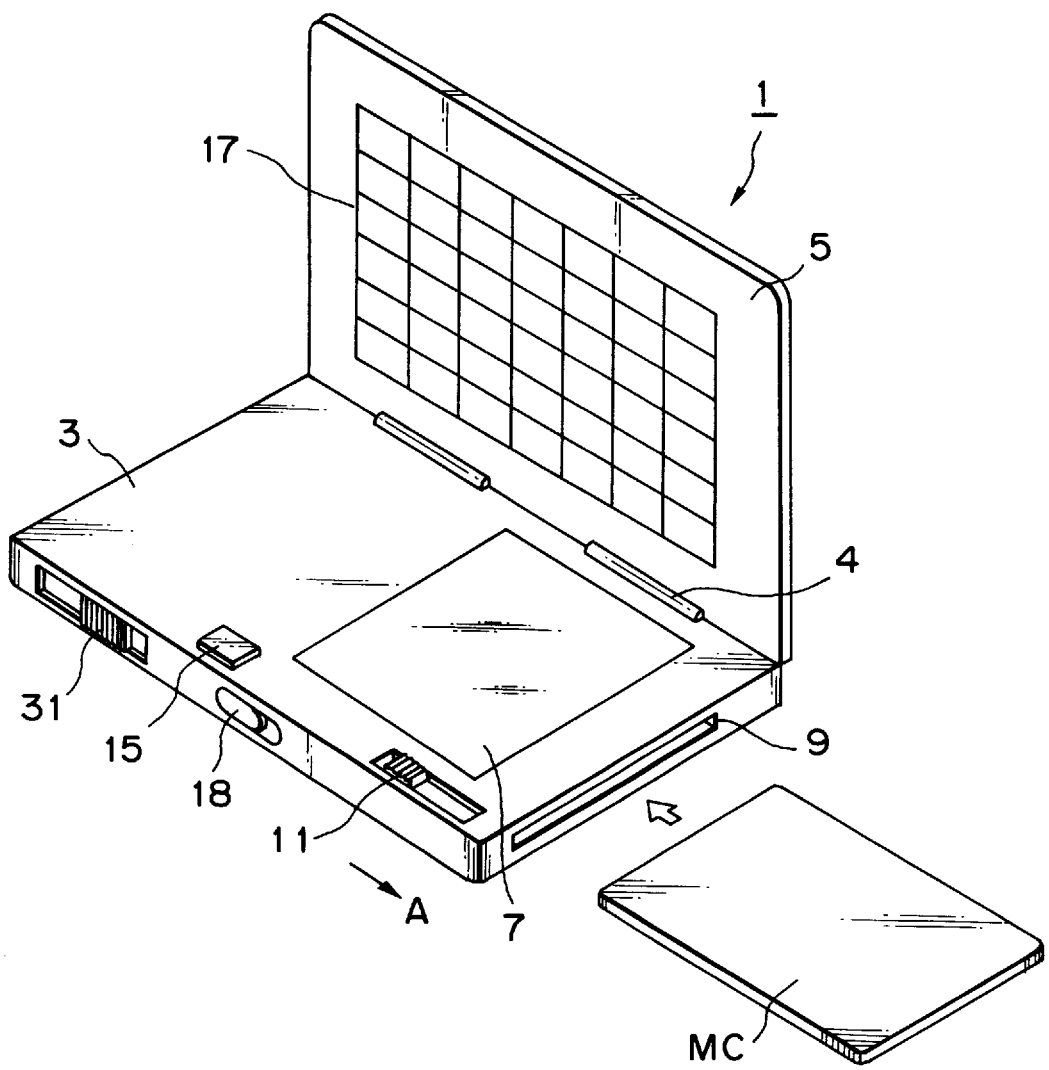
FIG. 1 is a perspective view showing an overall apparatus according to an embodiment.
Figure 2:
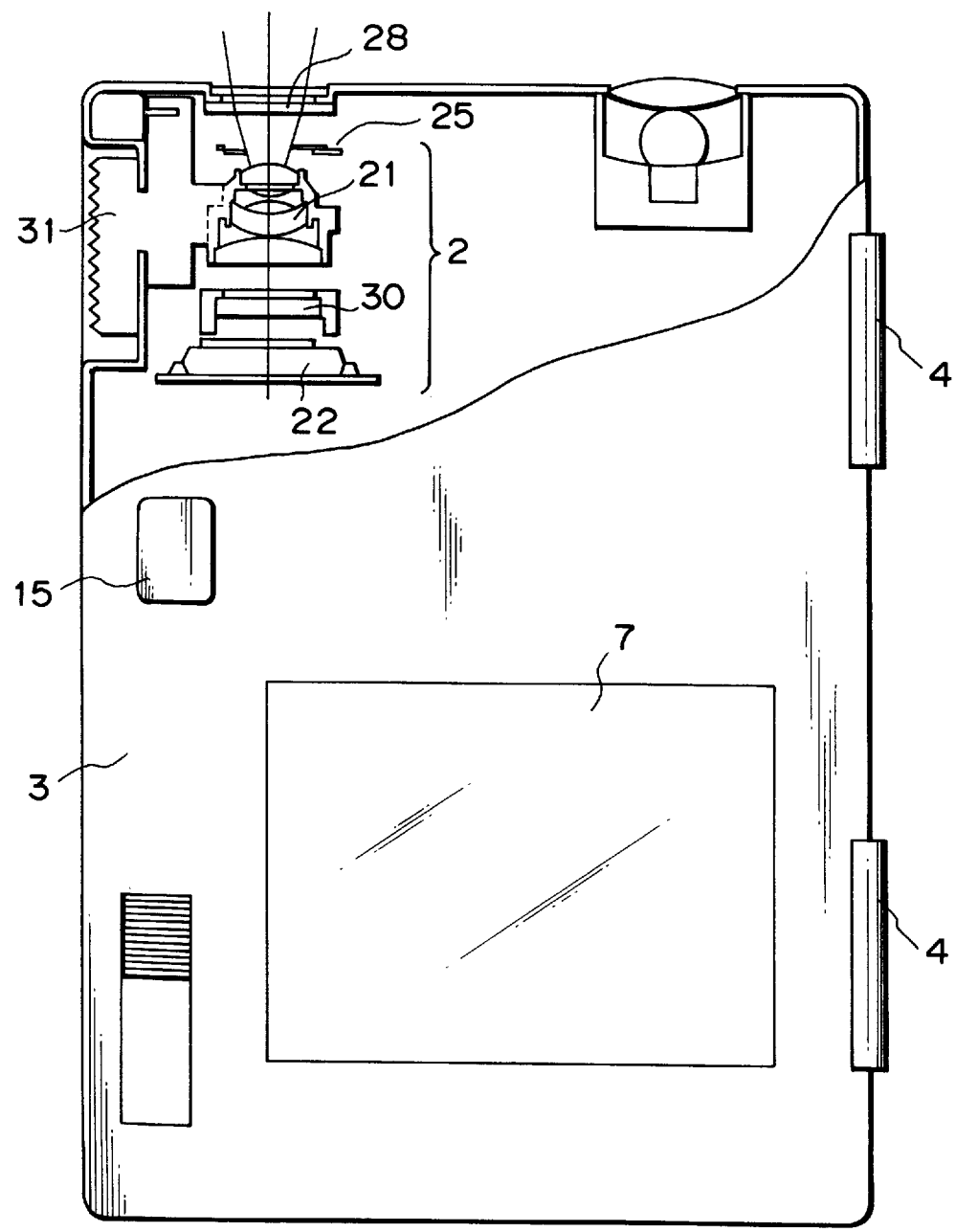
FIG. 2 is a sectional view of the apparatus shown in FIG. 1.

FIG. 1 is a perspective view showing the overall apparatus of an embodiment, FIG. 2 is a sectional view thereof, and FIG. 10 is a block diagram of an electric circuit. Reference numeral 1 denotes a notebook type electronic camera apparatus of an embodiment. The camera apparatus 1 comprises a camera body 3 and an upper lid 5. The camera body 3 is mechanically and electrically connected to the upper lid 5 through a hinge 4 by means of a known mechanism. A switch (not shown) is arranged in the hinge 4. The open/closed state of the upper lid 5 can be detected by the hinge 4. Various kinds of cards can be mounted in a card slot 9. New functions can be added to the camera body 3 in accordance with the contents of ROMs incorporated in the respective cards. That is, if a memory card MC incorporating an image recording memory and a camera control CPU is mounted in the card slot 9, the camera body 3 serves as an electronic camera.

The functions of the camera body in which the memory card MC is mounted will be described below.

The interior of the camera body 3 is arranged, as shown in FIG. 2. Reference numeral 2 denotes a photographic unit. The photographic unit 2 comprises a CCD 22 for photo-electrically converting an object image focused by a photographic lens 21, a diaphragm shutter 25, a low-pass filter 28, and an infrared cut filter 30. Reference numeral 31 denotes a focus control knob formed on a member for holding the photographic lens. When the focus control knob is vertically slid in FIG. 2, a distance between the photographic lens 21 and the CCD 22 is changed to perform focus control. The photographic unit is a known means, and a detailed description thereof will be omitted.

A signal extracted as an electrical signal by the photographic unit 2 is sampled by a known signal processing circuit 40 to obtain a video signal displayed on a liquid crystal display device 7 or data recorded in a memory 51 in the memory card MC. The signal processing circuit 40 also performs signal processing, e.g., processing for reproducing a video signal from the memory information to display video information recorded in the memory 51 on the liquid crystal display device 7.

Figure 6A:
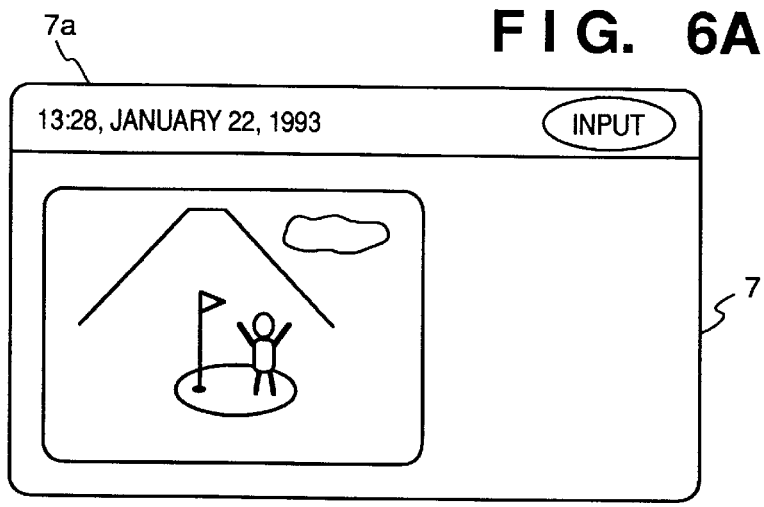
FIG. 6A is a view showing a display example of the liquid crystal display device of the embodiment shown in FIG. 1.
Figure 6B:
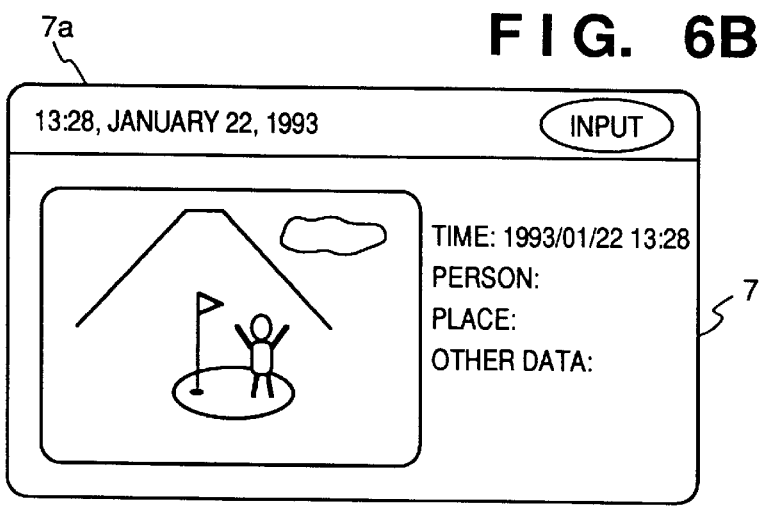
FIG. 6B is a view showing a display example of the liquid crystal display device of the embodiment shown in FIG. 1.
Figure 6C:
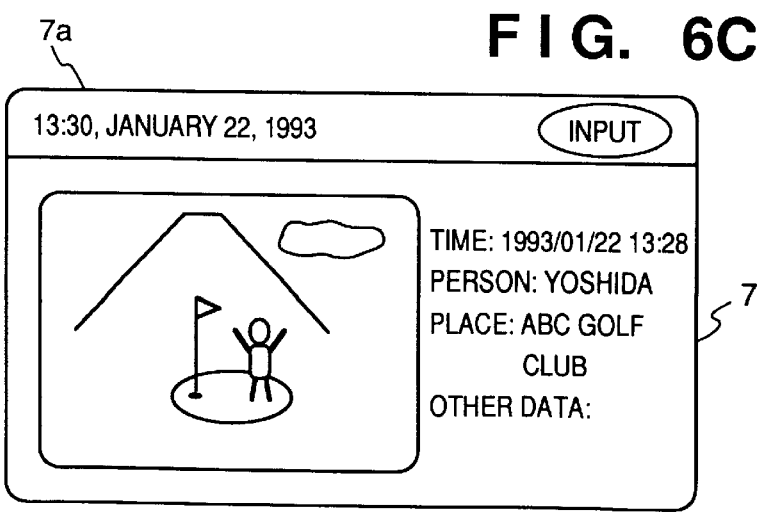
FIG. 6C is a view showing a display example of the liquid crystal display device of the embodiment shown in FIG. 1.

The liquid crystal display device 7 displays various kinds of information. When the camera body serves as an electronic still camera, the liquid crystal display device 7 serves as an electronic viewfinder (EVF) as shown in FIGS. 6A, 6B, and 6C to display a currently photographed image. A known electrostatic switch 44 is arranged on the display screen of the liquid crystal display device. When a pen (not shown) is brought into contact with the screen, the contact position on the screen is detected.

Reference numeral 15 denotes a release button for generating a photography start trigger; and 18, a power switch for ON/OFF-controlling the power supply of the camera body. A panel switch group 17 (FIG. 1) is arranged on the inner surface of the upper lid 5 and can be operated while the hinge 4 is set in an open state. Part of the panel switch group 17 is used for an electronic notebook function incorporated in a ROM 41 of the camera body, and the remaining part of the panel switch group 17 has functions changed depending on the types of cards mounted in the card slot 9.

The camera body 3 has a CPU 45, while the memory card MC has a CPU 50.

The CPU 50 controls the photographic unit 2, the signal processing circuit 40, the memory 51, and the like and performs the above camera operations.

The operations of the release button 15, the power switch 18, and the panel switch group 17 are detected by the CPU 45 in the camera body, and detection signals are transmitted to the CPU 50 in the memory card MC.

A built-in clock 43 for managing time is arranged in the camera body 3. As electronic notebook functions, a schedule function and a data management function for a telephone number, an address, and the like are prepared in the ROM 41 of the camera body. These programs are executed by the CPU 45 in the camera body 3.

The schedule and data (e.g., a telephone number and an address) are stored in a data memory 42 in the camera body 3.

Functions such as the schedule function which are associated with the present invention will be described below. Other functions can be constituted by known techniques, and a detailed description thereof will be omitted.

Figure 3:
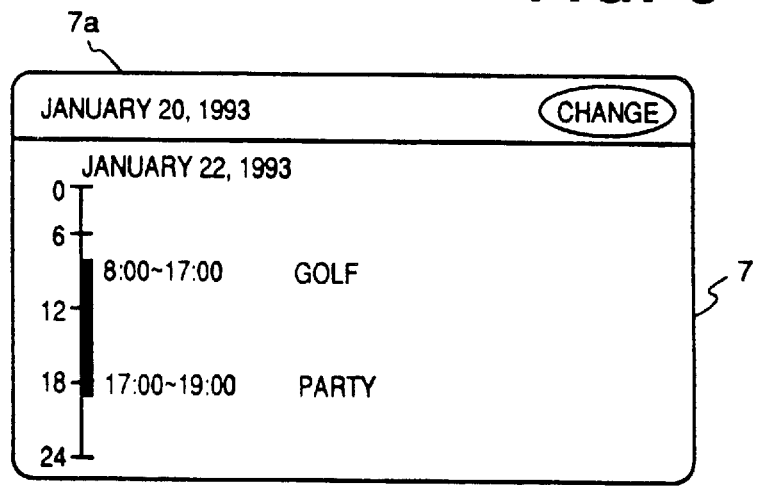
FIG. 3 is a view showing a display example of a liquid crystal display device of the embodiment shown in FIG. 1.

The operation of the schedule function of the apparatus of this embodiment will be described below. FIG. 3 shows the display screen of a schedule table of the liquid crystal display device 7 of this embodiment with reference to an example on Jan. 22, 1993. In this display, a golf is scheduled from 8:00 to 17:00 on Jan. 22, 1993, and a party is scheduled from 17:00 to 19:00. The current time obtained by the built-in clock is always displayed in an upper portion 7a of the liquid crystal display device 7.

FIGS. 4A, 4B, and 4C are views for explaining schedule data. FIG. 4A shows the data structure of the schedule data. A schedule [n] consists of data m representing the number of included data and data (data type and contents). FIG. 4C shows an example of the contents of the schedule data shown in FIG. 3. Schedule [1] has seven data as associated data, i.e., event data "golf", time data "1993/01/22/08/00-1993/01/22/17/00", person data "Yoshida", "Inoue", and "Goto", place data "ABC Gold Club", and other data "appointment: 6 o'clock, Shibuya". This data structure is illustrated in FIG. 4B. Similarly, as shown in FIG. 4B, schedule [2] has the following associated data: event data "party", time data "1993/01/22/17/00-1993/01/22/19/00", person data "Yoshida", "Inoue", "Goto", "Arai", "Yamamoto", "Hamada", and "Aoyama", and place data "ABC Golf Club".

Numbers (data types) "0", "1", "2", "3", "4" following the above data represent the following data types respectively representing an event, time, a person, a place, and other data. When an input pen (not shown) is brought into contact with (to be referred to as "is operated at" hereinafter) a portion "golf" on the display screen in FIG. 3, the associated data is displayed, as shown in FIG. 5A. When the input pen is operated at a portion "party" on the screen, the associated data is displayed, as shown in FIG. 5B.

The above schedule function is executed by the CPU 45 in the camera body 3.

The operation of the camera function of the apparatus of this embodiment will be described below.

FIG. 6A shows the display screen of the liquid crystal display device 7 when the camera function is used. The liquid crystal display device 7 serves as an electronic viewfinder (EVF) for displaying images continuously photographed by an image pickup device. In addition, the current time counted by the built-in clock is displayed in the upper portion 7a of the liquid crystal display device 7. When a release switch is depressed in this state, the corresponding image is stored and recorded in the memory of the memory card MC.

At this time, the photographic time, i.e., 13:28, Jan. 22, 1993 at which photography is performed as shown in FIG. 6B is automatically read by the CPU 45, transmitted to the CPU 50, and automatically recorded as associated data.

Figure 7A:
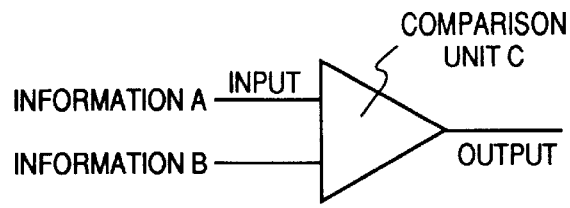
FIG. 7A is a diagram showing the arrangement of a comparison unit for adding information of the embodiment shown in FIG. 1.

Schedule information is referred to to determine whether event data can be added. FIG. 7A is a view showing the function of a comparison unit C arranged in the CPU 45 of the camera body 3. The comparison unit C receives information A and information B and outputs the inclusion relation of these pieces of information. More specifically, when the contents of the information A are identical to those of the information B, the comparison unit C outputs "1". When the contents of the information A are included in those of the information B, the comparison unit C outputs "2"; otherwise, the comparison unit C outputs "3".

Processing associated with addition of event data will be described with reference to a flow in FIG. 7B. In step S1, photographic time (in this case, 13:28, Jan. 22, 1993) is input to the information A (i.e., information A="1993/01/22/13/28"). In step S2, n=1 is set. In step S3, schedule time data is input to the information B. In step S4, the information A is compared with the information B by the comparison unit C. In schedule [1] shown in FIG. 4B, the information B is "1993/01/22/08/00-1993/01/22/17/00", so that the information A is included in the information B. For this reason, the comparison result becomes "2". In step S5, an event "golf" is added as data associated with the image. In schedule [2] in FIG. 4B, since the information B is "1993/01/22/17/00-1993/01/22/19/00", the information A is not associated with the information B. For this reason, the comparison result becomes "3". In this case, the event is not added. In steps S6 and S7, loop control is performed to compare all the schedule data, and events are appropriately added.

The image data received by the apparatus 1 of this embodiment and the above additional information are stored in the memory 51 or the data memory 42. The stored data are referred to by a processing method to be described below.

Figure 7B:
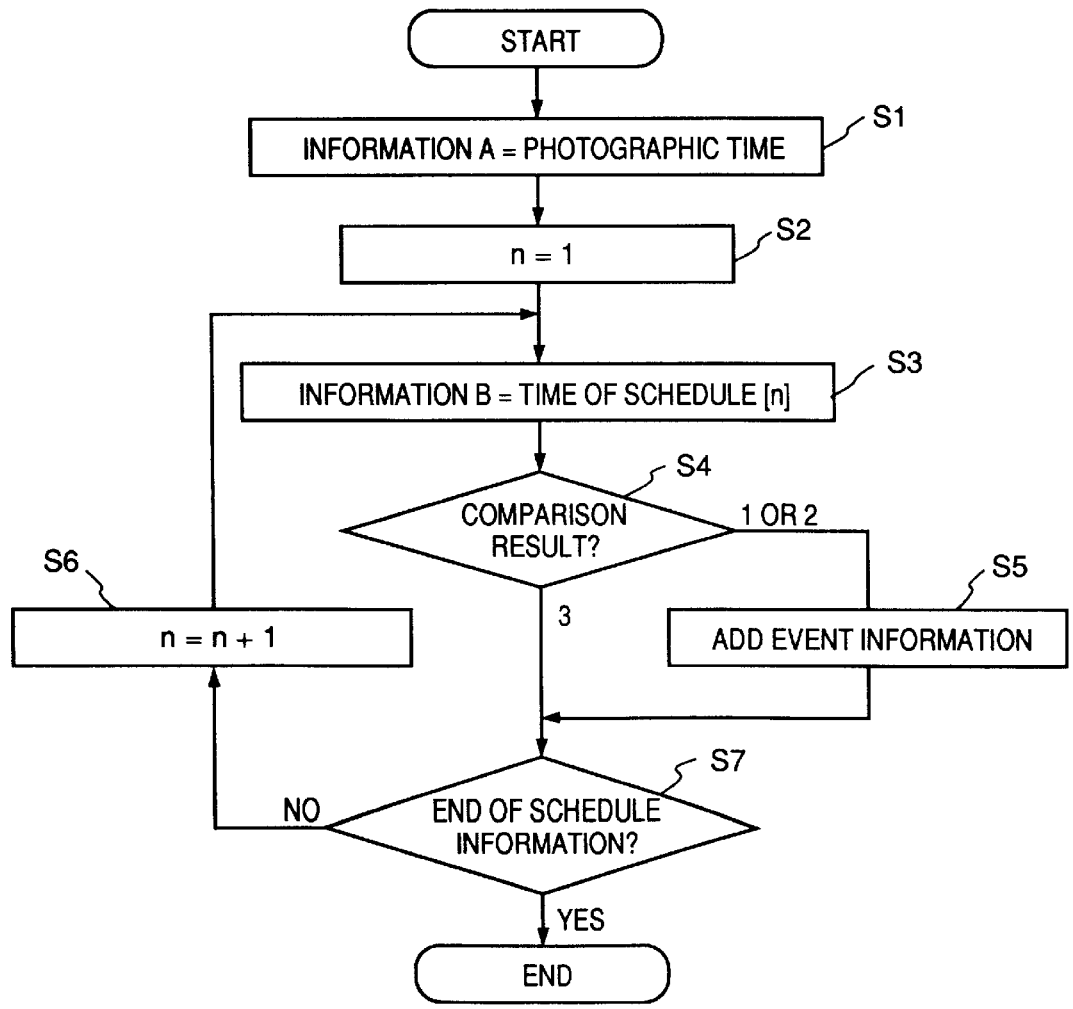
FIG. 7B is a flow chart showing the operation algorithm of the comparison unit shown in FIG. 7A.

The flow shown in FIG. 7B is executed by the CPU 45 in the camera body 3. The event information addition (S5) is performed such that event information to be added is transmitted from the CPU 45 to the CPU 50 in the memory card MC and the CPU 50 adds the event data to the corresponding image data and records the resultant data.

For example, when the input pen (not shown) is operated at a display screen portion "person" in FIG. 6B and a name of person (in this case, "Yoshida") is input, it can be recorded as associated data, as shown in FIG. 6C. When the input pen is operated at a display screen portion "place", and a name of place (in this case, "ABC Golf Club") is input, it can be recorded as associated data, as shown in FIG. 6C. In addition, when the input pen is operated at the "other data", and data is input, it can be recorded as associated data.

These processes are performed such that the CPU 45 in the camera body 3 detects the presence/absence of an operation, recognizes information to be added, and transmits it to the CPU 50 in the memory card MC, and the CPU 50 adds the additional data to the corresponding image data.

In the data structure of the above photographed image, as shown in FIG. 8A, an image [n] comprises data m representing the number of included data, data (data type and contents), and image data. An image shown in FIG. 6C has the following associated data: event data "golf", time data "1993/01/22/13/28", person data "Yoshida", and place data "ABC Golf Club". The data of image [1] can be illustrated, as shown in FIG. 8B.

A search process for image data with additional information generated by the apparatus of this embodiment will be described below.

Figure 11A:
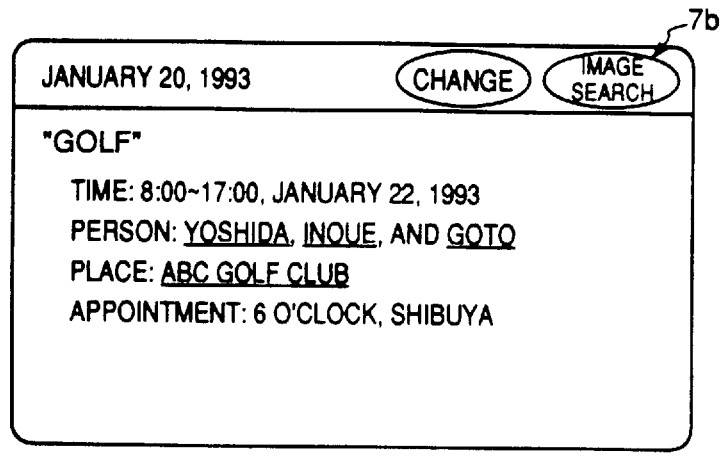
FIG. 11A is a view showing underlined data in the associted data display screen shown in FIG. 5A.
Figure 11B:
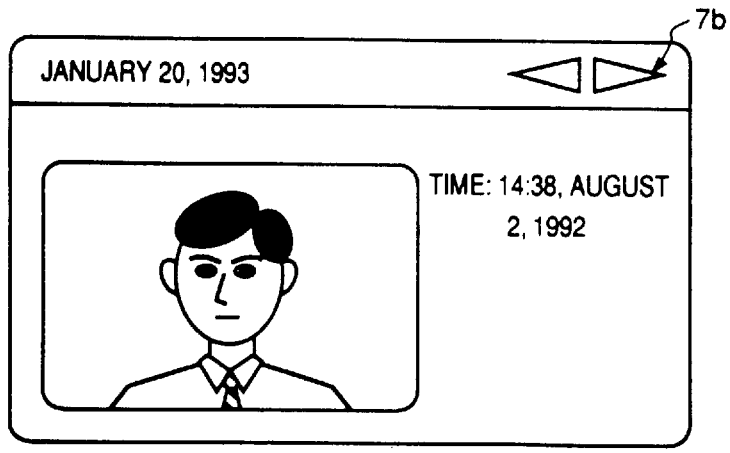
FIG. 11B is a view showing an image data related to "Inoue"

FIG. 11A shows underlined data in the associated data display screen shown in FIG. 5A. The underlined data (e.g., "Inoue") indicates the presence of image data having data having the same contents (i.e., data "Inoue") as those of the underlined data as the associated data. For this reason, for example, when a portion "Inoue" is operated, the latest data is selected from the image data having "Inoue" as the associated data and is displayed (FIG. 11B). In addition, a search operation along the time axis can be performed using arrow keys in an upper right portion 7b.

Figure 9A:
FIG. 9A is a view showing a display example of the liquid crystal display device of the embodiment in FIG. 1.

When a command for displaying schedule data of Jan. 22, 1993 is input from the panel switch group 17, the above image data with the additional information is searched, and a corresponding schedule table is displayed. As shown in FIG. 9A, to check a schedule screen display as a past schedule display, i.e., to check a schedule table of January 22 on January 24, an "image search" key is displayed in an upper right portion 7b of the liquid crystal display device 7. When this key is operated, a display shown in FIG. 9B appears. In this display, there are underlined data (e.g., "golf"). This indicates the presence of image data having time data included in the time data of the data "golf". For example, assume that a screen portion "golf" is operated. Since the data "golf" has time data "1993/01/22/08/00-1993/01/22/17/00" as associated data, images having time data included in the time data of the data "golf" are searched and displayed from an image closest to "1993/01/22/08/00" (FIG. 9D). At this time, a search operation along the time axis can be performed using arrow keys in the upper right portion 7b. For example, if a photographer memorizes the date at which he played golf, an image can be efficiently searched by the above method. A method of searching an image when a photographer forgets the date at which he played golf will be described below. In the display state of FIG. 9B, when the photographer operates the "event" key in the upper right portion 7b, event information stored as associated data of the image data in the memory card MC is displayed (FIG. 9C). When the event data "golf" is operated, images having the data "golf" as associated information are searched and displayed from the latest one (FIG. 9D). At this time, a search operation along the time axis can also be performed using the arrow keys in the upper right portion 7b.

Figure 9B:
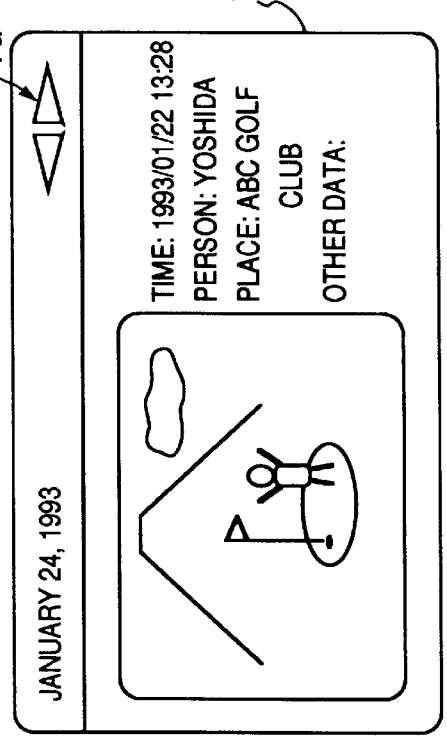
FIG. 9B is a view showing a display example of the liquid crystal display device of the embodiment in FIG. 1.
Figure 9C:
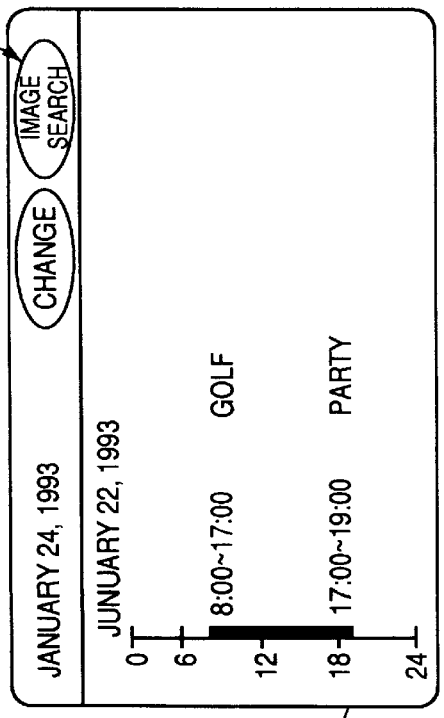
FIG. 9C is a view showing a display example of the liquid crystal display device of the embodiment in FIG. 1.
Figure 9D:
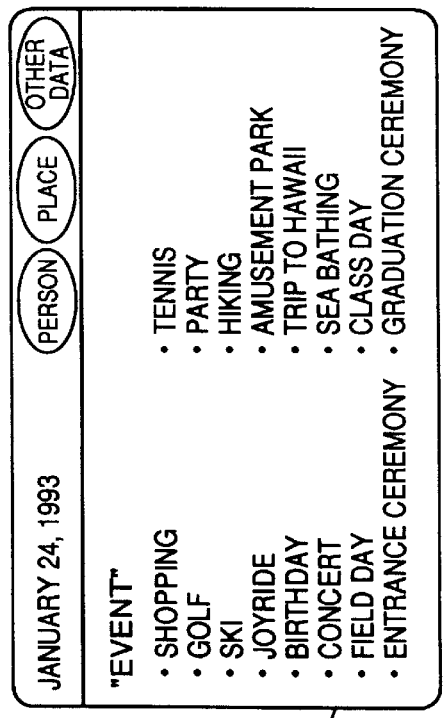
FIG. 9D is a view showing a display example of the liquid crystal display device of the embodiment in FIG. 1.

In the display state shown in FIG. 9B, when one of the "person" key, "place" key, and "other data" key in the upper right portion 7b is operated, a list of person information, place information, and other information stored as the associated data of the image data in the memory card MC are displayed in accordance with the operated search key. When given information "X" is operated in the list, images having the information "X" as the associated information are searched and displayed from the latest one.

These processes are also executed by the CPU 45 in the camera body 3. However, the CPU 50 performs read access to data stored in the memory card MC and sends necessary data to the signal processing circuit 40 and the CPU 45 in the camera body 3.

Figure 12:
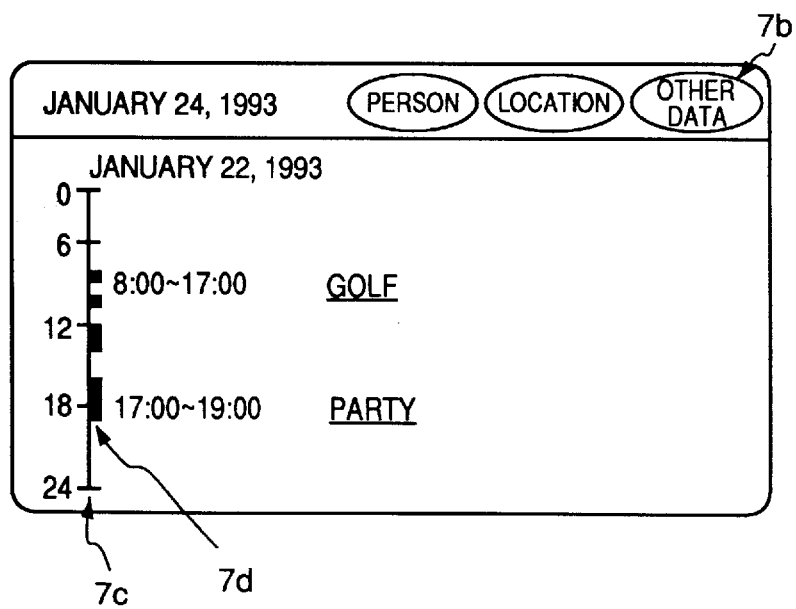
FIG. 12 is a view showing another display example of FIG. 9B.

The display screen in FIG. 9B may be displayed, as shown in FIG. 12. When the "person" key in the upper right portion 7b is operated in FIG. 12, data indicating the presence of image data having the same person data as that having this data (e.g., "golf") is underlined and displayed (in this case, "party"). When a portion "golf" is operated, images having, as the associated data, the person data "Yoshida", "Inoue", and "Goto" having data "golf" are searched and displayed from the one closer to the time "1993/01/22/08/00-1993/01/22/17/00" (FIG. 9D). At this time, a search operation can be performed along the time axis using the arrow keys in the upper right portion 7b.

In this manner, when the "person" key is operated as the search data, and data is input as "golf", person data having the data "golf" as the associated data can be referred to and searched. For this reason, the search condition is an AND product of "golf" and "person", thereby efficiently searching the data. In this case, the search operation can be performed without memorizing a name of person.

The same operation as described above is performed in the state of FIG. 12 upon operations of the "location" key and "other data" key in the upper right portion 7b.

Black marks 7d along a time axis 7c indicate schedule data representing periods during which image photography has been performed. When each mark 7d is operated, the corresponding images can be searched and displayed. Therefore, when a portion of about "13:00" in the black mark in FIG. 12 is operated, the image in FIG. 9D is searched.

Note that a method of performing a search operation using the "event", "person", "place", or "other data" key can be practiced without the schedule function (i.e., the function for displaying time and events in a table).

The image data and the corresponding additional information which are generated by the apparatus of this embodiment are recorded in the memory of the memory card MC. This serves as a very effective means when the memory card MC is subjected to a search operation by another search unit or the image data in the memory card MC are to be copied in a large-capacity recording unit and searched.

In the even information addition process shown in FIG. 7B, the information A is photographic time (date). However, the information A is not limited to this. For example, any information associated with a photographed image, such as a name of photographer and a name of photographic place may be used. If the information A is a name of photographer, a group name to which a plurality of photographers belong is assigned to the information B. If a name of photographer is included in the category of a predetermined group name (in the process of the comparison unit in FIG. 7A), this group name is added to the photographed image data and is stored. If the information A is a photographic place, a predetermined wider area to which a plurality of photographic places is assigned to the information B. If a photographic place is included in the category of the predetermined area (in the process of the comparison unit in FIG. 7A), this area name is added to the photographed image data and stored.

As has been described above, according to the present invention, an information equipment for processing a second type of information having a first type of information as associated information, and a third type of information having the first type of information as the associated information comprises a comparison means for comparing the first type of information A associated with the third type of information with the first type of information B associated with the second type of information. If a comparison result from the comparison unit represents that the information A is identical to the information B or the information A is included in the information B, the second type of information is added to the associated information of the third type of information. During photography, information for searching a photographed image can be automatically added, and therefore the recorded photographed image can be easily searched.

Assume photography is performed at given time in an information equipment for processing schedule information having time data as associated data and image information having photographic time as associated data. In this case, if schedule information representing the same time as the given time or including the given time is present, this schedule data is added to the photographed image information as associated data, so that the photographic contents can be labeled simultaneously with photography, thereby facilitating the subsequent image search operation.

The above embodiment of the present invention has exemplified a notebook type electronic camera which integrally includes a photographic function, a schedule function, a search function, and a reproduction function. However, these functions need not be integrally included to obtain the same effect as described above if a combination of these functions falls within the scope of the appended claims.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus comprising:
   (A) image inputting means for inputting image data;
   (B) event inputting means for inputting event data;
   (C) detecting means for detecting whether first data associated with the image data is identical to second data associated with the event data;
   (D) storage means for storing the event data and the image data so as to be associated together directly, when said detecting means detects that the first data is identical to the second data; and
   (E) searching means for searching for image data on the basis of the event data stored by said storage means.

2. The apparatus according to claim 1, wherein the first data represents a time at which the image data is input by said image inputting means.

3. The apparatus according to claim 1, wherein the first data represents a name of a person who appears in an image represented by said image data, and the second data represents a name of a person who takes part in the event.

4. The apparatus according to claim 1, wherein the first data represents a place at which the image data is input by said image inputting means, and the second data represents a place where the event is held.

5. An information processing apparatus comprising:
   (A) image inputting means for inputting image data;
   (B) event inputting means for inputting event data;
   (C) detecting means for detecting whether first data associated with the image data is included in second data associated with the event data;
   (D) storage means for storing the event data and the image data so as to be associated together directly, when said detecting means detects that the first data is included in the second data; and
   (E) searching means for searching for image data on the basis of the event data stored by said storage means.

6. The apparatus according to claim 5, wherein the first data represents a time at which the image data is input by said image inputting means, and the second data represents a time interval for the event.

7. The apparatus according to claim 5, wherein the first data represents a name of a person who appears in an image represented by the image data, and the second data represents a name of a person who takes part in the event.

8. The apparatus according to claim 5, wherein the first data represents a place at which the image data is input by said image inputting means, and the second data represents a name of an area where the event is held.

9. An information processing method comprising the steps of:

(A) inputting image data;

(B) inputting event data;

(C) detecting whether first data associated with the image data is identical to second data associated with the event data;

(D) storing the event data and the image data so as to be associated together directly, when it is detected in said detecting step that the first data is identical to the second data; and (E) searching for image data on the basis of the event data stored in said storing step.

10. The method according to claim 9, wherein the first data represents a time at which the image data is input.

11. The method according to claim 9, wherein the first data represents a name of a person who appears in an image represented by the image data, and the second data represents a name of a person who takes part in the event.

12. The method according to claim 9, wherein the first data represents a place at which the image data is input, and the second data represents a place where the event is held.

13. An information processing method comprising the steps of:

(A) inputting image data;

(B) inputting event data;

(C) detecting whether first data associated with the image data is included in second data associated with the event data;

(D) storing the event data and the image data so as to be associated together directly, when it is detected in said detecting that the first data is included in the second data; and (E) searching for image data on the basis of the event data stored in said storing step.

14. The method according to claim 13, wherein the first data represents a time at which the image data is input in said image inputting step, and the second data represents a time interval for the event.

15. The method according to claim 13, wherein the first data represents a name of a person who appears in an image represented by the image data, and the second data represents a name of a person who takes part in the event.

16. The method according to claim 13, wherein the first data represents a place at which the image data is input in said image inputting step, and the second data represents a name of an area where the event is held.

* * * * *